(12) United States Patent
Dancel et al.

(10) Patent No.: US 11,429,843 B2
(45) Date of Patent: Aug. 30, 2022

(54) VEHICLE OPERATION LABELING

(71) Applicant: Ford Global Technologies, LLC, Dearborn, MI (US)

(72) Inventors: Sophia Dancel, Rochester, MI (US); Levasseur Tellis, Southfield, MI (US); Anthony Mario D'Amato, Canton, MI (US); Colm Boran, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 478 days.

(21) Appl. No.: 16/683,912

(22) Filed: Nov. 14, 2019

(65) Prior Publication Data

US 2021/0150309 A1    May 20, 2021

(51) Int. Cl.
| | |
|---|---|
| *G06K 9/00* | (2022.01) |
| *G06N 3/04* | (2006.01) |
| *G06N 3/08* | (2006.01) |
| *G06K 9/62* | (2022.01) |
| *G06V 10/44* | (2022.01) |
| *G06V 30/194* | (2022.01) |

(52) U.S. Cl.
CPC ......... *G06N 3/0454* (2013.01); *G06K 9/6256* (2013.01); *G06N 3/0445* (2013.01); *G06N 3/08* (2013.01); *G06V 10/454* (2022.01); *G06V 30/194* (2022.01); *G06T 2207/20084* (2013.01)

(58) Field of Classification Search
CPC ...... G06N 3/0454; G06N 3/0445; G06N 3/08; G06K 9/6256; G06K 9/6254; G06K 9/6255; G06V 10/454; G06V 30/194; G06V 10/82; G06V 20/58; G06V 20/56; G06T 2207/20084; B60W 30/0956
See application file for complete search history.

(56) References Cited

U.S. PATENT DOCUMENTS

| | | | |
|---|---|---|---|
| 10,169,678 B1 | 1/2019 | Sachdeva et al. | |
| 2018/0373980 A1 | 12/2018 | Huval | |
| 2019/0047584 A1* | 2/2019 | Donnelly | ............ B60W 30/025 |
| 2019/0065864 A1* | 2/2019 | Yu | ............. G06V 20/56 |
| 2019/0113917 A1* | 4/2019 | Buch | .................... G05D 1/0285 |

\* cited by examiner

*Primary Examiner* — Ping Y Hsieh
(74) *Attorney, Agent, or Firm* — Frank A. MacKenzie; Bejin Bieneman PLC (57) ABSTRACT

A computer, including a processor and a memory, the memory including instructions to be executed by the processor to identify patterns in first high anticipation scenarios based on user identification, wherein high anticipation scenarios include video sequences wherein a first vehicle will be within a specified distance of a first object in a first environment around the first vehicle, wherein user identification is determined by viewing portions of a respective video sequence. A first model including a first deep neural network can be trained to determine second high anticipation scenarios based on the patterns identified in the first high anticipation scenarios and a second model including a second deep neural network can be trained to modify locations and velocities of second objects in the first high anticipation scenarios and output modified high anticipation scenarios. The computer can be further programmed to train a third model including a third deep neural network to operate a vehicle based on the modified high anticipation scenarios output by the second model.

20 Claims, 6 Drawing Sheets

| REACTION | RECOGNIZE | |
| --- | --- | --- |
| | EASY | DIFFICULT |
| EASY | EASY/EASY | DIFFICULT/EASY |
| DIFFICULT | EASY/DIFFICULT | DIFFICULT/DIFFICULT |

VEHICLE OPERATION LABELING

BACKGROUND

Vehicles can be equipped with computing devices, networks, sensors and controllers to acquire information regarding the vehicle's environment and to operate the vehicle based on the information. Vehicle sensors can provide data concerning routes to be traveled and objects to be avoided in the vehicle's environment. Operation of the vehicle can rely upon acquiring accurate and timely information regarding objects in a vehicle's environment while the vehicle is being operated on a roadway.

DETAILED DESCRIPTION

Vehicles can be equipped to operate in both autonomous and occupant piloted mode. By a semi- or fully-autonomous mode, we mean a mode of operation wherein a vehicle can be piloted partly or entirely by a computing device as part of an information system having sensors and controllers. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more moving objects such as vehicles and pedestrians, etc., in an environment around a vehicle and can be used by a computing device in the vehicle to operate the vehicle.

A computing device in a vehicle can input vehicle sensor data into a deep neural network to determine data regarding the environment around the vehicle including locations of objects, for example. Training the deep neural network to determined data regarding an environment around a vehicle can be improved by high anticipation scenarios. High anticipation scenarios are defined as video sequences that correspond to traffic situations that will require that a computing device in a vehicle operate the vehicle to avoid contact or near contact with an object within a fixed period of time (typically, e.g., <5) seconds. Objects can include vehicles, pedestrians, bicycles, and animals including domesticated animals (pets) and wild animals and near contact is defined as passing within less than a specified distance, typically, e.g., less than one meter from an object. This definition is consistent with the definition of contact or near contact as defined in "Operational Design Domain for Automated Driving Systems", Krzysztof Czarnecki, Waterloo Intelligent System Engineering Lab, University of Waterloo, Waterloo, Canada, N2L 3G1, Jul. 21, 2018.

Disclosed herein is method including identifying patterns in first high anticipation scenarios based on user identification, wherein high anticipation scenarios include video sequences wherein a first vehicle will be within a specified distance of a first object in a first environment around the first vehicle, wherein user identification is determined by viewing portions a respective video sequence, training a first model including a deep neural network to determine second high anticipation scenarios based on the patterns identified in the first high anticipation scenarios, training a second model including a second deep neural network to modify locations and velocities of second objects in the first high anticipation scenarios and output modified high anticipation scenarios and training a third model including a third deep neural network to operate a vehicle based on the modified high anticipation scenarios output by the second model. High anticipation scenarios can include video sequences wherein the first vehicle will be within the specified distance of the first object in the first environment around the first vehicle within a small number of seconds.

User identification can include combining user identification data from a plurality of users. Video data acquired by sensors included in the second vehicle can be processed using the second deep neural network to identify high anticipation scenarios and to determine a second object in a second environment around the second vehicle. The second deep neural network can be trained to determine a location of and a distance to an object. The second vehicle can be operated by controlling second vehicle powertrain, steering and brakes to avoid the second object in the second environment around the second vehicle. The first deep neural network can be a convolutional neural network that includes convolutional layers and fully connected layers. The first deep neural network can be trained to identify high anticipation scenarios in a database of traffic scenarios. The second deep neural network can be a convolutional neural network that includes convolutional layers and fully connected layers. The first object can include one or more of a vehicle, a pedestrian, a bicycle and an animal. The first deep neural network can identify high anticipation scenarios in a data base of sample video sequences. Training the second deep neural network can include determining an evasive action to be used as ground truth in training the second deep neural network. The evasive action can be output by the second deep neural network in response to input video sequence data that includes the high anticipation scenario. Operating the vehicle using the second deep neural network can include performing the evasive action.

Further disclosed is a computer readable medium, storing program instructions for executing some or all of the above method steps. Further disclosed is a computer programmed for executing some or all of the above method steps, including a computer apparatus, programmed to identify patterns in first high anticipation scenarios based on user identification, wherein high anticipation scenarios include video sequences wherein a first vehicle will be within a specified distance of a first object in a first environment around the first vehicle, wherein user identification is determined by viewing portions a respective video sequence, train a first model including a deep neural network to determine second high anticipation scenarios based on the patterns identified in the first high anticipation scenarios, train a second model including a second deep neural network to modify locations and velocities of second objects in the first high anticipation scenarios and output modified high anticipation scenarios and train a third model including a third deep neural network to operate a vehicle based on the modified high anticipation scenarios output by the second model. High anticipation scenarios can include video sequences wherein the first vehicle will be within the specified distance of the first object in the first environment around the first vehicle within a small number of seconds.

The computer can be further programmed to combine user identification including combining user identification data from a plurality of users. Video data acquired by sensors included in the second vehicle can be processed using the second deep neural network to identify high anticipation scenarios and to determine a second object in a second environment around the second vehicle. The second deep neural network can be trained to determine a location of and a distance to an object. The second vehicle can be operated by controlling second vehicle powertrain, steering and brakes to avoid the second object in the second environment around the second vehicle. The first deep neural network can be a convolutional neural network that includes convolutional layers and fully connected layers. The first deep neural network can be trained to identify high anticipation scenarios in a database of traffic scenarios. The second deep neural network can be a convolutional neural network that includes convolutional layers and fully connected layers. The first object can include one or more of a vehicle, a pedestrian, a bicycle and an animal. The first deep neural network can identify high anticipation scenarios in a data base of sample video sequences. Training the second deep neural network can include determining an evasive action to be used as ground truth in training the second deep neural network. The evasive action can be output by the second deep neural network in response to input video sequence data that includes the high anticipation scenario. Operating the vehicle using the second deep neural network can include performing the evasive action.

Figure 1:
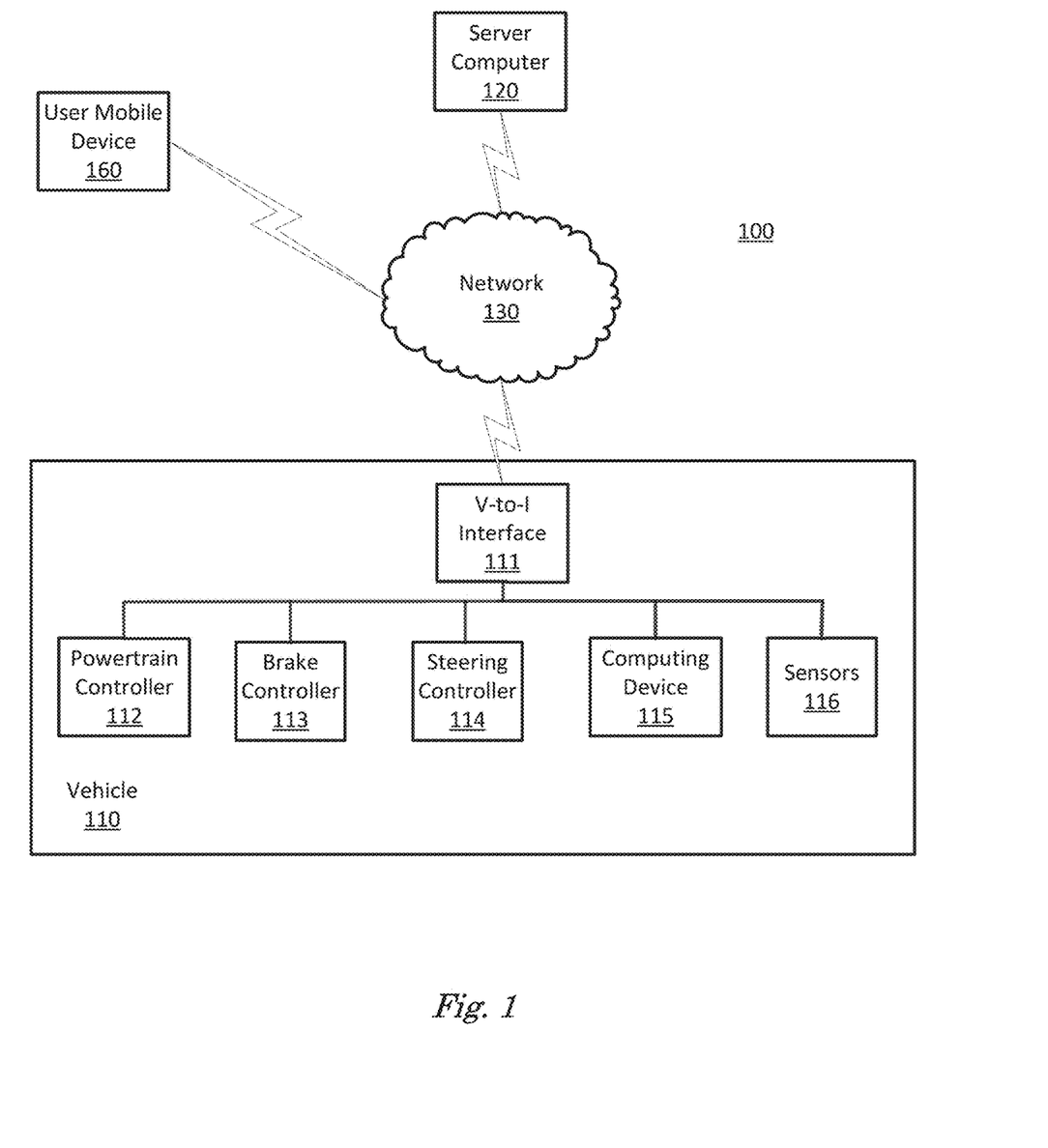
FIG. 1 is a block diagram of an example traffic infrastructure system.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive information regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular and Dedicated Short Range Communications (DSRC) wireless packet networks. Computing device 115 may be configured for communicating with other vehicles 110 through V-to-I interface 111 using vehicle-to-vehicle (V-to-V) networks, e.g., according to DSRC and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
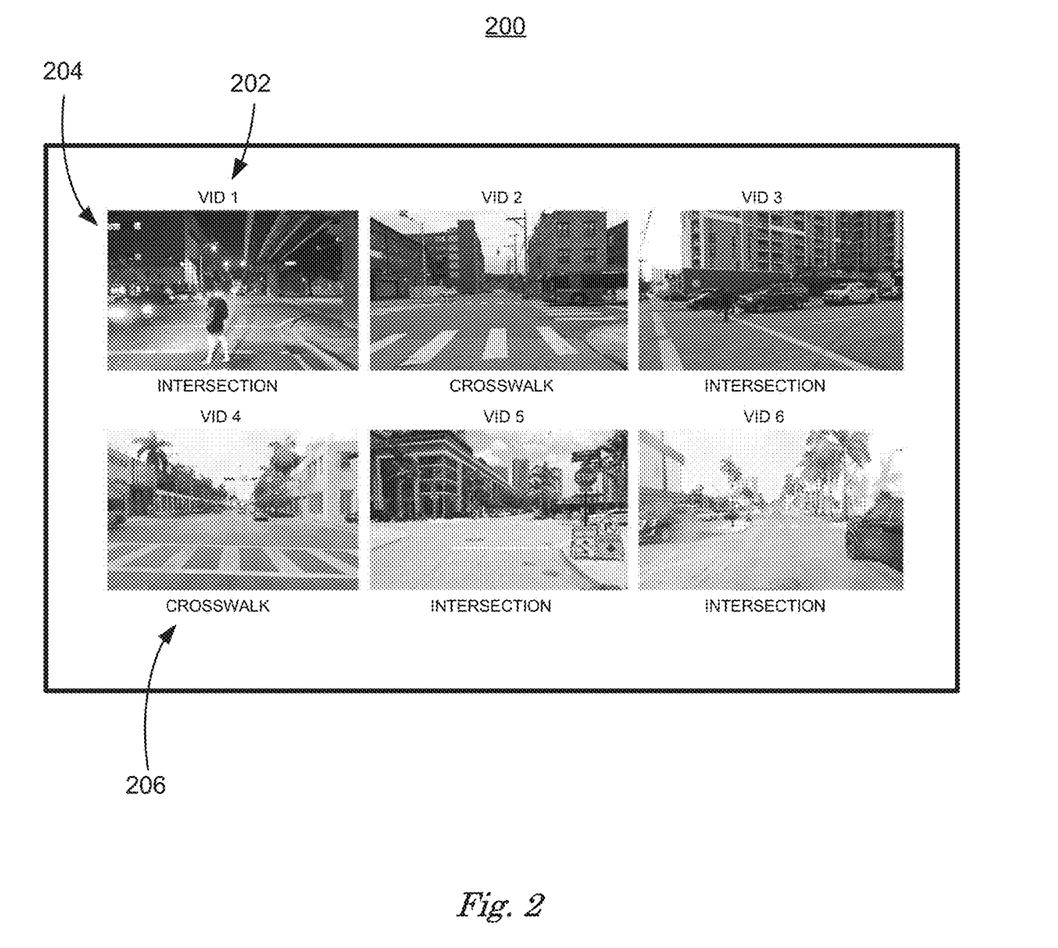
FIG. 2 is a diagram of example video sequences.

FIG. 2 is a diagram of sample video sequences 200. Sample video sequences 200 can be displayed on a computer screen and include a video sequence number 202, a thumbnail 204 corresponding to a reduced image of a frame from each sample video sequence 200 and a title 206 with a brief description of the contents of each sample video sequence 200. Sample video sequences 200 can be acquired by recording video sequences from video sensors included in a vehicle 110 as it is operated on roadways in traffic. Sample video sequences can include vehicle sensor data recorded at the time the sample video sequence 200 data was recorded, where vehicle sensor data can include one or more of processed video data, lidar data, or radar data, where the video data, lidar data and radar data can be processed by a computing device to determine locations, velocities, and accelerations of objects in the video sequence data 200.

Sample video sequences 200 corresponding to naturalistic driving sequences can be included in a database of sample video sequences 200. Including sample video sequences 200 in a database can permit the use of a user interface as illustrated in FIG. 2, where users can select a sample video sequence 200 from a screen as illustrated in FIG. 2 and then can view the selected entire video sequence at full resolution on a computer screen. A user can view a sample video sequence 200 and determine whether the sample video sequence 200 corresponds to a high anticipation scenario as defined above based on watching the entire sample video sequence 200 and determining whether the vehicle 110 recording the sample video sequence 200 contacts or nearly contacts an object or if the vehicle 110 performs an evasive maneuver to avoid contact or near contact with the object. An evasive maneuver is defined as controlling vehicle 110 powertrain, steering and brakes to perform one or more of acceleration, steering, and braking to avoid contact or near contact with an object.

Figure 3:
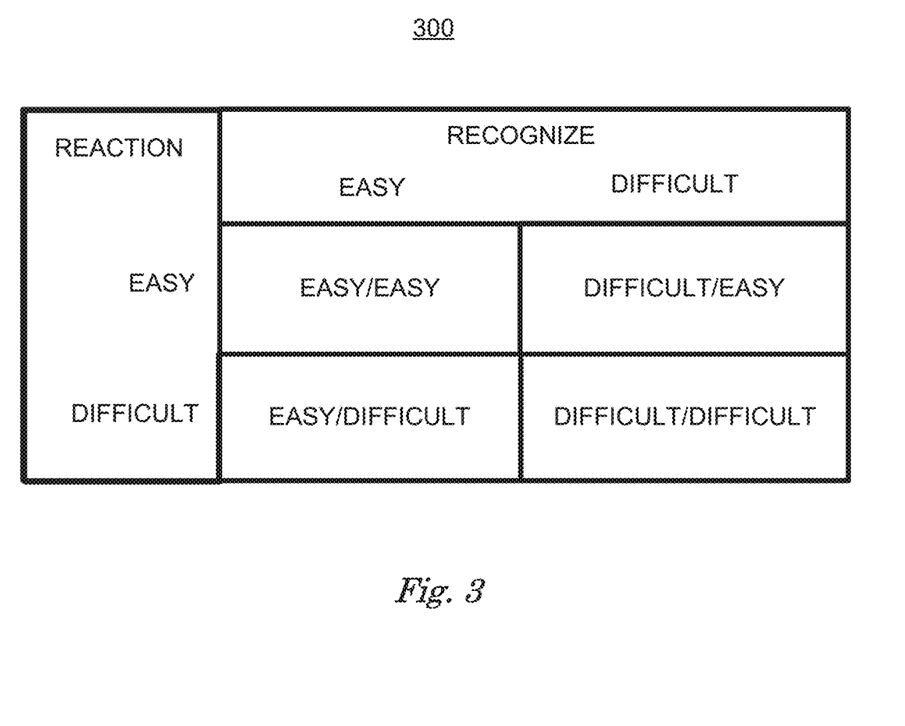
FIG. 3 is a diagram of an example high anticipation rating matrix.

FIG. 3 is a diagram of a sample video sequence high anticipation rating matrix 300. High anticipation rating matrix 300 can be determined by user identification, where user identification measures a user's rating of a video sequence with respect to the ability of a user to recognize a high anticipation scenario based on a video frame occurring during the beginning of the sample video sequence 200 combined with a user's ability to react or choose an evasive maneuvering that would avoid an object based on viewing a single frame of video data. Recognition is rated as either easy, meaning that the upcoming evasive maneuver is readily apparent from a single frame of video data at the beginning of the sequence, or rated as difficult to recognize from a single frame of video data at the beginning of the sequence. An example of an easy to recognize high anticipation scenario would be a pedestrian seen in a crosswalk on a roadway. An example of a difficult to recognize high anticipation scenario would be a pedestrian on a sidewalk near a roadway partially or completely obscured by parked cars. Reaction is rated as easy, meaning that an evasive maneuver can be readily determined by a user based on the viewed video frame or difficult, meaning that a user would take more time to determine what the appropriate evasive maneuver would be. An example of an easy reaction would be viewing a pedestrian at a crosswalk while the vehicle is traveling at low speed. An example of a difficult reaction would be viewing a pedestrian at a crosswalk while traveling at high speed in traffic and having to choose between braking and changing lanes.

Sample video sequences 200 can be rated by user identification data including high anticipation matrix 300 to determine into which of the four categories, easy/easy, easy/difficult, difficult/easy, or difficult/difficult a sample video sequence 200 is categorized. This rating can be crowdsourced, where crowdsourcing in this context means having a plurality of users rate the same sample video sequences independently and then combining (e.g., by averaging and/or using some other statistical measure) the results. Each of the four ratings can be given a numerical value and the ratings for each sample video sequence 200 can be averaged to determine the final score for each sample video sequence. The final scores for the sample video scenarios 200 can be summarized as being low anticipation, meaning that users agree that recognition and reaction are easy, or high anticipation, meaning that users agree that recognition or reaction or both are difficult. Frames of video data from high anticipation scenarios can be recorded and stored for subsequent training of a deep neural network. Operation of a vehicle 110 can be improved by training a deep neural network to recognize high anticipation scenarios in video data while the vehicle 110 is operating on a roadway. Recognition of high anticipation scenarios can permit a computing device 115 to begin evasive maneuvers as soon as the high anticipation scenario is recognized and thereby increase the probability that contact or near contact with an object will be avoided.

Figure 4:
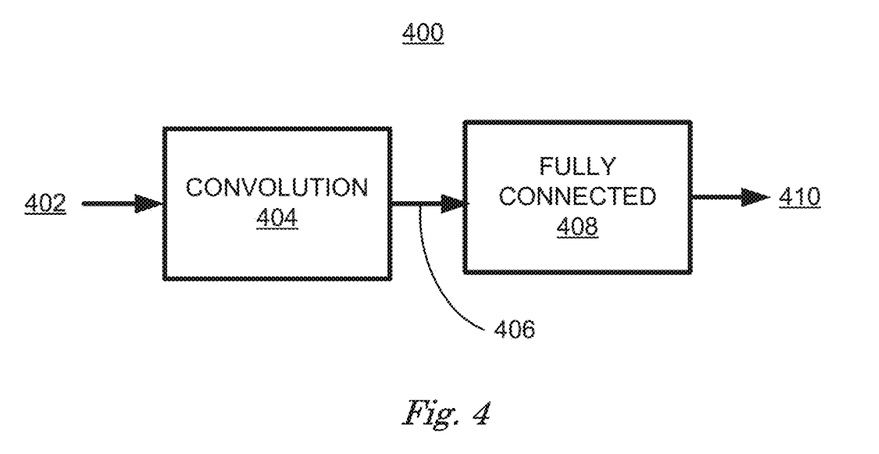
FIG. 4 is a diagram of an example generative adversarial network.

FIG. 4 is a diagram of a first deep neural network (DNN) 400. A first DNN 400 is an example of a model that can be trained to identify video sequences that include high anticipation scenarios, where a model is defined as an artificial intelligence process that can be trained or programmed to identify patterns of high anticipation behavior in video sequences. Models can include rule-based machine learning programs or, as illustrated in FIG. 4, a DNN 400, for example. First DNN 400 can be a convolutional neural network that includes a convolutional layers 404 (CONVOLUTION) that generate an hidden variables 406 by convolving an input video sequence 402 with convolution parameters learned at training time. The hidden variables 406 are input to fully connected layers 408 (FULLY CONNECTED) that determine whether the input video sequence 402 includes a high anticipation scenario. The first DNN 400 can be trained to identify video sequences 402 that include high anticipation scenarios by inputting video sequences that include high and low anticipation scenarios to the first DNN 400 and comparing back propagated results 410 with ground truth from the crowdsourced user identification data determined as discussed in relations to FIGS. 2 and 3, above. Ground truth includes data regarding objects in the high anticipation data determined by techniques independent from the first DNN 400, in this example crowdsourced user identification data such as sample video sequence high anticipation rating matrix 300. The DNN 400 can process the input video sequence 402 and determine whether the video sequence corresponds to a high anticipation scenario and output data regarding objects in the sample video sequence such as object location, velocity, and acceleration. Object location, velocity, and acceleration can be determined based on processed video data, lidar data, and radar data acquired by a vehicle at the time the sample video sequence was acquired.

The first DNN 400 can be trained to identify patterns in high anticipation scenarios in a database of traffic scenarios included in sample video sequences 200 included in a database of sample video sequences 200 as discussed above in relation to FIG. 2. Patterns in high anticipation scenarios are defined by behavior of objects in a video sequence that can be observed repeatedly in a plurality of video sequences. For example, a vehicle entering an intersection from the right from an intersecting roadway can be identified as a pattern in a high anticipation scenario. The synthetic video sequences 200 can be identified as high anticipation scenarios by training the first DNN 400 to identify patterns in sample video sequences 200 that include portions where a vehicle in the sample video sequence 200 contacts another vehicle or nearly contacts another vehicle in the scene description, where nearly contact is defined as coming within less than a specified distance, typically within one meter, of the other vehicle as defined in the previously cited "Operational Design Domain for Automated Driving Systems". Patterns in a high anticipation scenario can include object behavior in which an object, including a vehicle, a pedestrian, a bicycle, or an animal is occluded (partially visible) or not visible until a few seconds before a vehicle can contact or nearly contact the object within the specified distance. The first DNN 400 can be trained to output results 410 that includes the location, velocity and acceleration of objects to be avoided in the input video sequence data 402.

Using a first DNN 400 can improve training of a second deep neural network (DNN) 500 as discussed in relation to FIG. 5, below, to operate a vehicle 110 by identifying a large number (greater than 100) high anticipation scenarios in a large database of sample video sequences 200. The number of high anticipation scenarios can be increased by modifying or perturbing the input high anticipation scenarios to create several output results 410 for each input high anticipation scenario. The high anticipation video scenarios can be then processed to determine the correct evasive action to be performed by a vehicle 110 in response to the high anticipation scenario and the correct evasive action can be used as ground truth to program a second DNN 500 to output the correct evasive action in response to input video sequences that appear similar to the high anticipation scenarios identified by the first DNN 400. Similar appearance in video sequences is defined as video sequences that include objects, including vehicles, pedestrians, bicycles, animals, etc. in the same relationship to the vehicle acquiring the video sequence, for example approaching an intersection or entering a roadway. By identifying high anticipation scenarios and training a second DNN 500 to recognize the high anticipation scenarios prior to contact of near contact with an object, the DNN 550 can output an evasive action that permits the vehicle 110 to avoid the contact or near-contact.

Figure 5:
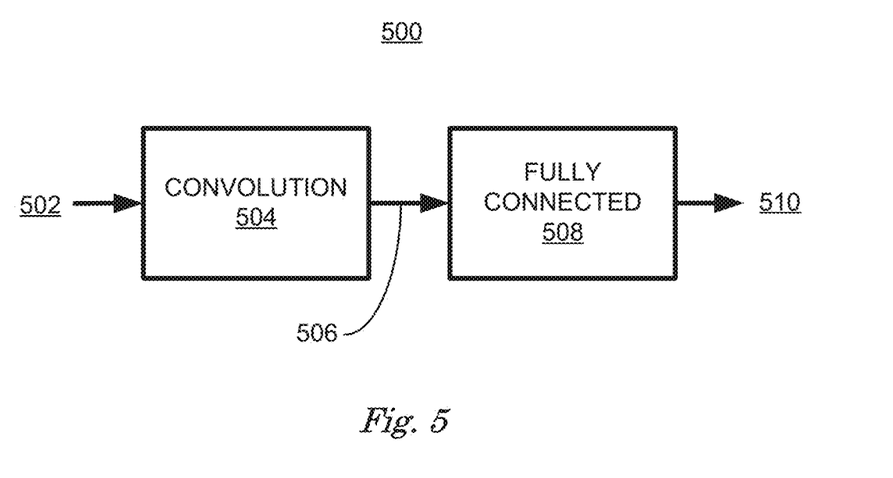
FIG. 5 is a diagram of an example deep neural network.

FIG. 5 is a diagram of an example second deep neural (DNN) 500. As discussed above in relation to FIG. 4, DNN 500 is an example of a model that can be used to process video sequence data. The second DNN can be a convolutional neural network that processes video sequence data using convolutional layers (CONVOLUTION) 504 and fully connected layers (FULLY CONNECTED) 508. Video sequence data 502 acquired from video sensors included in a vehicle 110 can be input to convolutional layers 504. Convolutional layers 504 process the input video data 502 to form hidden variables 506. Hidden variables 506 correspond to encoded data that includes data regarding objects in input video sequence data 502. Hidden variables 506 are passed to fully connected layers 508 that process the hidden variables 506 to produce output states 510. Output states 510 include data that informs a computing device 115 that the input video sequence data 502 includes a high anticipation scenario can instruct the computing device 115 as to an appropriate evasive maneuver to take to avoid an object in the input video data 502.

The second DNN 500 can be trained to modify or perturb the patterns of behavior of objects in the input video sequences. Modifying or perturbing the patterns of behavior of objects in the input video sequences is defined as changing the locations, velocities, and accelerations of the objects in the input video sequences by small amounts, where a small amount is defined as a small percentage (less that 10%) change in location, velocity or acceleration. By modifying or perturbing the behavior of objects by small amounts, a variety of output results 410 can be produced for a single input pattern. Techniques described herein improve training of a DNN to operate a vehicle 110 by generating a large number (greater than 1000) of high anticipation scenarios by modifying or perturbing patterns in high anticipation scenarios identified by a first DNN 400 in a database of sample video sequences 200 and using the modified video sequences to train a third DNN to operate a vehicle 110.

The second DNN 500 can produce output data 510 including high anticipation scenarios and by training the DNN 500 with the sample video sequences 200 determined by first DNN 400 along with ground truth regarding the locations of objects to be avoided in the video sequence data 502 also determined by first DNN 400. The second DNN 500 can try a plurality of solutions that are back-propagated to be compared with the correct (i.e., ground truth) solution as determined by the crowdsources results. When the second DNN 500 achieves a correct solution, the programming parameters for the convolutional layers 504 and fully connected layers 508 that achieved the correct solution are saved. The collection of programming parameters that achieve correct results for the entire set of sample video sequences can be stored as programming values for the trained second DNN 500. By modifying or perturbing the patterns included in high anticipation scenarios DNN 500 can generate a large number of different video sequences to use in training a third DNN to identify high anticipation scenarios. Increasing the number of different video sequences can improve the training of a third DNN to identify high anticipation scenarios in video sequence data acquired while a vehicle 110 is operated on a roadway.

A third DNN can be trained to identify high anticipation scenarios in video sequence data acquire by a vehicle 110 as the vehicle 110 is operated on a roadway. As the vehicle is operated on roadway a computing device 115 included in the vehicle can acquire video sequence data and input the video sequence data to a trained third DNN to determine if the video sequence data includes a high anticipation scenario. When the third DNN determines that video sequence data includes a high anticipation scenario, the third DNN can output data to the computing device 115 to warn the computing device 115 that a high anticipation scenario has been identified. The computing device 115 can command vehicle powertrain, steering and brakes via controllers 112, 113, 114 to perform an evasive maneuver as determined by the output data to avoid an object. Techniques described herein improve operation of a vehicle 110 by recognizing high anticipation scenarios and providing output data in addition to other vehicle sensor data used to operate a vehicle 110 and thereby increase the probability that the vehicle 110 will perform an appropriate evasive maneuver to avoid contact or near contact with an object.

Performing an evasive maneuver can include determining a vehicle path polynomial upon which to operate a vehicle 110. A vehicle path polynomial is a polynomial function that includes a series of n connected points in the X, Y plane that includes predicted vehicle 110 trajectories at n future time steps. The n connected points are determined by a polynomial function in the X, Y plane, where the X, Y axes are determined by the direction of vehicle 110, with the X direction being parallel to the direction of travel and the Y direction being perpendicular to the direction of travel, for example. Chebyshev's theorem states that n points can be represented exactly by a polynomial of degree (n−1). In this case n points, where n can be a large number, greater than 100 for example, can be represented by a polynomial of degree k, where, in this case, k can be a number less than or equal to 3, for example. The n connected points in a vehicle path polynomial can be represented by a polynomial function in X and Y of degree k or less. For example, a path polynomial can represent 10 seconds of elapsed time and can be sampled at 100 milliseconds/sample or 10 Hz to yield n=100 sample points. In this example, the n=100 sample points in vehicle path polynomial can be represented by a polynomial function in X and Y of degree 3 or less.

The polynomial function in X and Y of degree k or less that represent the vehicle path polynomial can include one or more Bezier curves. Bezier curves are polynomial functions of degree k or less that each represent a disjoint subset of the n points, and that taken together, represent the entire set of n points. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets. Constraints on Bezier curves can make a vehicle path polynomial a steerable path polynomial by limiting the rates of longitudinal and lateral accelerations required to pilot a vehicle along the vehicle path polynomial, where braking torque and powertrain torque are applied as positive and negative longitudinal accelerations and clockwise and counter clockwise steering torque are applied as left and right lateral accelerations. By determining lateral and longitudinal accelerations to achieve predetermined target values within predetermined constraints within predetermined numbers of time periods, the vehicle path polynomial can be constrained to provide a vehicle path polynomial can be operated upon by vehicle 110 without exceeding limits on lateral and longitudinal accelerations.

Figure 6:
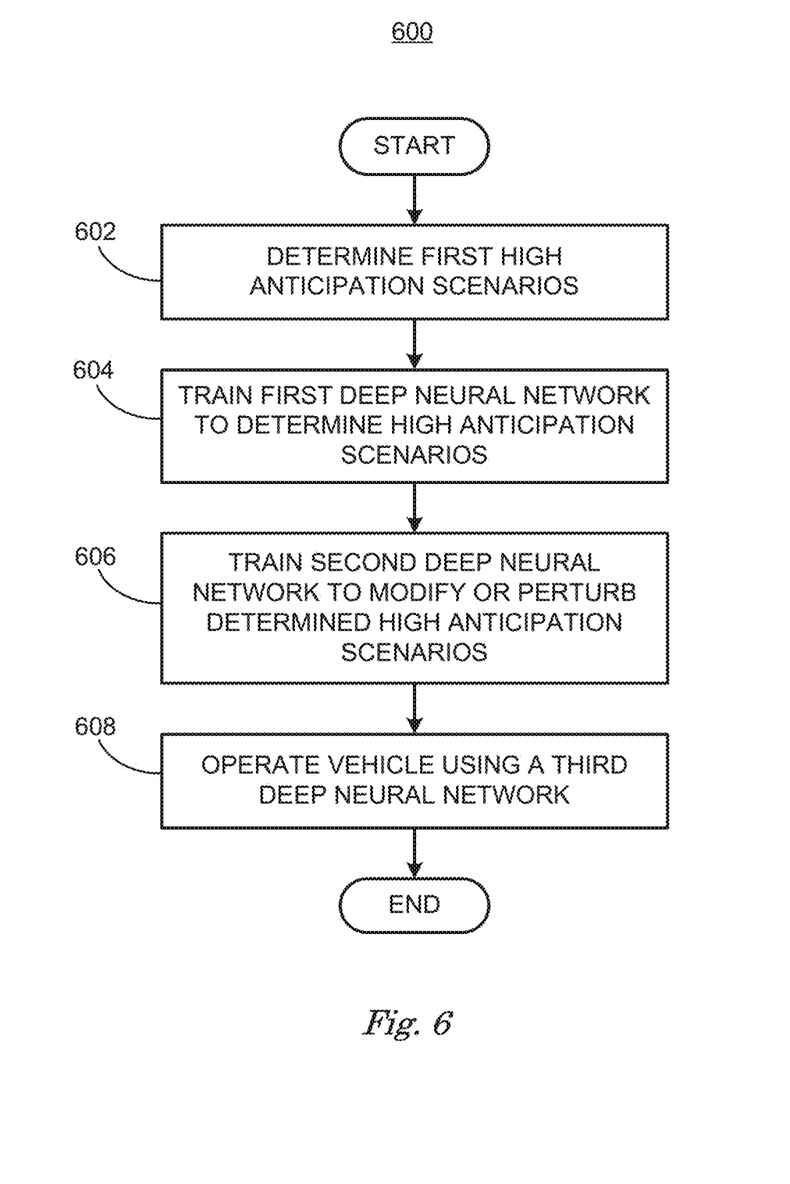
FIG. 6 is a flowchart diagram of an example process to operate a vehicle based on a deep neural network.

FIG. 6 is a diagram of a flowchart, described in relation to FIGS. 1-5, of a process 600 for operating a vehicle to recognize high anticipation scenarios and avoid contact or near contact with objects. Process 600 can be implemented by a processor of computing device, taking as input information from sensors, and executing commands, and outputting object information, for example. Process 600 includes multiple blocks that can be executed in the illustrated order. Process 600 could alternatively or additionally include fewer blocks or can include the blocks executed in different orders.

Process 600 begins at block 602, where sample video sequences 200 are analyzed by crowdsourcing to determine high anticipation scenarios as discussed in relation to FIGS. 2 and 3, above.

At block 604 the crowdsourced data regarding high anticipation scenarios is used to train a first DNN 400 to identify patterns in high anticipation scenarios based on video sequence data 402, crowdsourced ratings, and vehicle sensor data recorded and processed at the time the video sequence data 200 was recorded, where vehicle sensor data includes one or more of processed video data, lidar data, or radar data. The first DNN 400 can modify the patterns in high anticipation scenarios to provide more training data for a second DNN 500 that can be trained to operate a vehicle 110 and output data evasive maneuver data in response to identifying patterns of high anticipation scenarios in input video sequence data 502. The modifications can perturb the behavior of an input pattern in a high anticipation scenario to provide a larger data set of video sequences along with ground truth for training a third DNN.

At block 606 a second DNN 500 is trained based on the identified patterns of high anticipation scenarios output by first DNN 400. The second DNN 500 inputs video sequence data including patterns including high anticipation scenarios. Trained second DNN 500 can modify or perturb the object behavior in patterns including high anticipation scenario in input video sequence data 502 and output state 510 data that corresponds modified or perturbed patterns including high anticipation scenarios that can be used to train a third DNN to be used to a operate a vehicle 110 on a roadway. The third DNN can output data that permits a vehicle 110 to avoid contact or near contact with an object by including output data that identifies the location, velocity and acceleration of an object in the input video sequence data. Operating the vehicle 110 can include performing an evasive maneuver.

At block 608 computing device 115 can control vehicle powertrain, steering, and brakes to perform the evasive maneuver specified in data output by a third DNN by operating the vehicle 110 along a path polynomial as described above in relation to FIG. 5 to cause vehicle 110 to avoid an object Following block 608 process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
   a memory, the memory including instructions executable by the processor to:
      identify patterns in first high anticipation scenarios based on user identification, wherein high anticipation scenarios include video sequences wherein a first vehicle will be within a specified distance of a first object in a first environment around the first vehicle, wherein user identification is determined by viewing portions of a respective video sequence;
      train a first model including a first deep neural network to determine second high anticipation scenarios based on the patterns identified in the first high anticipation scenarios;
      train a second model including a second deep neural network to modify locations and velocities of second objects in the first high anticipation scenarios and output modified high anticipation scenarios; and
      train a third model including a third deep neural network to operate a vehicle based on the modified high anticipation scenarios output by the second model.

2. The computer of claim 1, wherein high anticipation scenarios include video sequences and ground truth regarding first objects, wherein ground truth includes lidar data, radar data, velocity data and acceleration data regarding the first objects, and wherein the first vehicle will be within the specified distance of the first object in the first environment around the first vehicle within a small number of seconds and wherein the first object may be occluded or not visible to the first vehicle until a small number of seconds before being with the specified distance.

3. The computer of claim 1, wherein user identification includes combining user identification data from a plurality of users.

4. The computer of claim 1, the instructions further including instructions to process video data acquired by sensors included in the second vehicle using the second deep neural network to identify high anticipation scenarios and to determine a second object in a second environment around the second vehicle.

5. The computer of claim 4, the instructions further including instructions to train the second deep neural network to determine a location of and distance to an object.

6. The computer of claim 5, the instructions further including instructions to operate the second vehicle by controlling second vehicle powertrain, steering and brakes to avoid the second object in the second environment around the second vehicle.

7. The computer of claim 1, wherein the first deep neural network is a convolutional neural network that includes convolutional layers and fully connected layers.

8. The computer of claim 1, the instructions further including instructions to train the first deep neural network to identify high anticipation scenarios in a database of traffic scenarios.

9. The computer of claim 1, wherein the second deep neural network is a convolutional neural network that includes convolutional layers and fully connected layers.

10. The computer of claim 1, wherein the first object includes one or more of a vehicle, a pedestrian, a bicycle, and an animal.

11. A method, comprising:
    identifying patterns in first high anticipation scenarios based on user identification, wherein high anticipation scenarios include video sequences wherein a first vehicle will be within a specified distance of a first object in a first environment around the first vehicle, wherein user identification is determined by viewing portions of a respective video sequence;
    training a first model including a deep neural network to determine second high anticipation scenarios based on the patterns identified in the first high anticipation scenarios;
    training a second model including a second deep neural network to modify locations and velocities of second objects in the first high anticipation scenarios and output modified high anticipation scenarios; and
    train a third model including a third deep neural network to operate a vehicle based on the modified high anticipation scenarios output by the second model.

12. The method of claim 11, wherein high anticipation scenarios include video sequences wherein the first vehicle will be within the specified distance of the first object in the first environment around the first vehicle within a small number of seconds.

13. The method of claim 11, wherein user identification includes combining user identification data from a plurality of users.

14. The method of claim 11, further comprising processing video data acquired by sensors included in the second vehicle using the second deep neural network to identify high anticipation scenarios and to determine a second object in a second environment around the second vehicle.

15. The method of claim 14, further comprising training the second deep neural network to determine a location of and a distance to an object.

16. The method of claim 15, further comprising operating the second vehicle by controlling second vehicle powertrain, steering and brakes to avoid the second object in the second environment around the second vehicle.

17. The method of claim 11, wherein the first deep neural network is a convolutional neural network that includes convolutional layers and fully connected layers.

18. The method of claim 11, further comprising training the first deep neural network to identify high anticipation scenarios in a database of traffic scenarios.

19. The method of claim 11, wherein the second deep neural network is a convolutional neural network that includes convolutional layers and fully connected layers.

20. The method of claim 11, wherein the first object includes one or more of a vehicle, a pedestrian, a bicycle and an animal.

\* \* \* \* \*